(12) United States Patent
Viloria et al.

(10) Patent No.: US 8,246,722 B2
(45) Date of Patent: Aug. 21, 2012

(54) USE OF IRON ORE AGGLOMERATES FOR ACID GAS REMOVAL

(75) Inventors: Alfredo Viloria, Caracas (VE); Mónica Román, Caracas (VE); Marvin Ricaurte, Caracas (VE); Yanine Gonzaléz, Miranda (VE); Rafael Yoll, Miranda (VE); Marcos Rosa-Brussin, Caracas (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 12/779,808

(22) Filed: May 13, 2010

(65) Prior Publication Data

US 2010/0313756 A1 Dec. 16, 2010

Related U.S. Application Data

(62) Division of application No. 12/415,389, filed on Mar. 31, 2009.

(51) Int. Cl.
*B01D 53/02* (2006.01)

(52) U.S. Cl. ............ 95/136; 502/84; 502/331; 502/343; 502/346; 502/400; 423/244; 423/593; 423/400

(58) Field of Classification Search .................. 502/400, 502/405; 423/244, 224, 225, 230
See application file for complete search history.

(56) References Cited

U.S. PATENT DOCUMENTS

| | | | |
|---|---|---|---|
| 4,201,751 A | 5/1980 | Holter et al. | |
| 4,283,373 A | 8/1981 | Frech et al. | |
| 4,311,680 A * | 1/1982 | Frech et al. | 423/230 |
| 4,721,582 A | 1/1988 | Nelson | |
| 4,774,213 A | 9/1988 | Schneider et al. | |
| 4,786,484 A | 11/1988 | Nelson | |
| 4,977,123 A * | 12/1990 | Flytzani-Stephanopoulos et al. | 502/84 |
| 6,500,237 B2 * | 12/2002 | Winchester et al. | 95/117 |
| 6,719,828 B1 | 4/2004 | Lovell et al. | |
| 6,743,405 B1 * | 6/2004 | Siriwardane | 423/244.06 |
| 7,081,434 B2 | 7/2006 | Sinha | |
| 2004/0149634 A1 * | 8/2004 | Hughes | 210/96.1 |
| 2007/0207077 A1 | 9/2007 | Ayyer et al. | |

\* cited by examiner

*Primary Examiner* — Melvin C Mayes
*Assistant Examiner* — Colette Nguyen
(74) *Attorney, Agent, or Firm* — Bachman & LaPointe, P.C.

(57) ABSTRACT

A regenerable sorbent for the removal of acid gas from a fluid stream. The regenerable sorbent is made from raw materials such as iron mineral, expansive clay and starch. Acid gas is removed from the fluid stream by a process where the raw materials are obtained, crushed, sifted, possibly pelletized, calcined and contacted with the fluid stream containing the acid gas.

11 Claims, 7 Drawing Sheets

USE OF IRON ORE AGGLOMERATES FOR ACID GAS REMOVAL

CROSS REFERENCE TO RELATED APPLICATIONS

This application is a divisional application of co-pending U.S. patent application Ser. No. 12/415,389 filed on Mar. 31, 2009.

BACKGROUND OF THE INVENTION

This invention relates to a composition for fluid treatment and processes for making and using the composition. In particular, the invention relates to a regenerable sorbent for the removal of hydrogen sulfide from production fluid streams and processes for making and using the sorbent.

Hydrogen sulfide can be present in various fluid streams and is often found in fluid streams associated with petroleum and gas production. The removal of the hydrogen sulfide from these fluid streams is desirable because of its toxicity, corrosive properties, and unpleasant odor.

Due to the increased need for greater natural gas production, the removal of hydrogen sulfide from production fluid streams has become essential. Prior art processes can be based upon physical absorption, solid absorption or chemical reaction.

These prior art processes are associated with numerous problems. Some require sorbents that when exposed to air are self igniting and thus non-renewable. The weak sulfur retention of these non-renewable sorbents leads to an adverse environmental impact and requires that after their use they be treated as hazardous waste. The prior art processes employing non-renewable sorbents that produce hazardous waste have proven to be costly.

There continues to be a need within the petroleum and gas production industry for a cost effective process for the removal of hydrogen sulfide from production fluid streams. The sorbent for the removal of hydrogen sulfide employed in the current application is not only cost effective through its ability to be easily renewed, the process also exhibits high single pass performance in its ability to remove hydrogen sulfide from a production fluid stream.

SUMMARY OF THE INVENTION

The primary object of the present invention is to provide a renewable sorbent for the removal of acid gas from a fluid stream.

It is a further object of the present invention to employ the renewable sorbent in a process for the removal of hydrogen sulfide gas from a production fluid stream.

In accordance with the present invention a composition is provided for the removal of acid gas from a fluid stream comprising iron mineral, vermiculite and starch.

In further accord with the present invention a process for the removal of acid gas from a fluid stream is provided comprising the steps of: crushing a composition comprising vermiculite and an iron mineral; sifting the crushed vermiculite and iron mineral composition; calcinating the vermiculite and iron mineral composition; and contacting the calcinated vermiculite and iron mineral composition with the fluid stream.

BRIEF DESCRIPTION OF THE DRAWINGS

A detailed description of preferred embodiments of the present invention follows, with reference to the attached drawings, wherein.

DETAILED DESCRIPTION

The invention relates to a cost effective system and process for the removal of acid gas from fluid streams.

Hereinafter the term "fluid" includes but is not limited to matter in gaseous and/or liquid state. The term "fluid" may refer to any one or all of the following terms: oil, gas, water, liquids in an oil well, gases in an oil well, air and the like.

Figure 1:
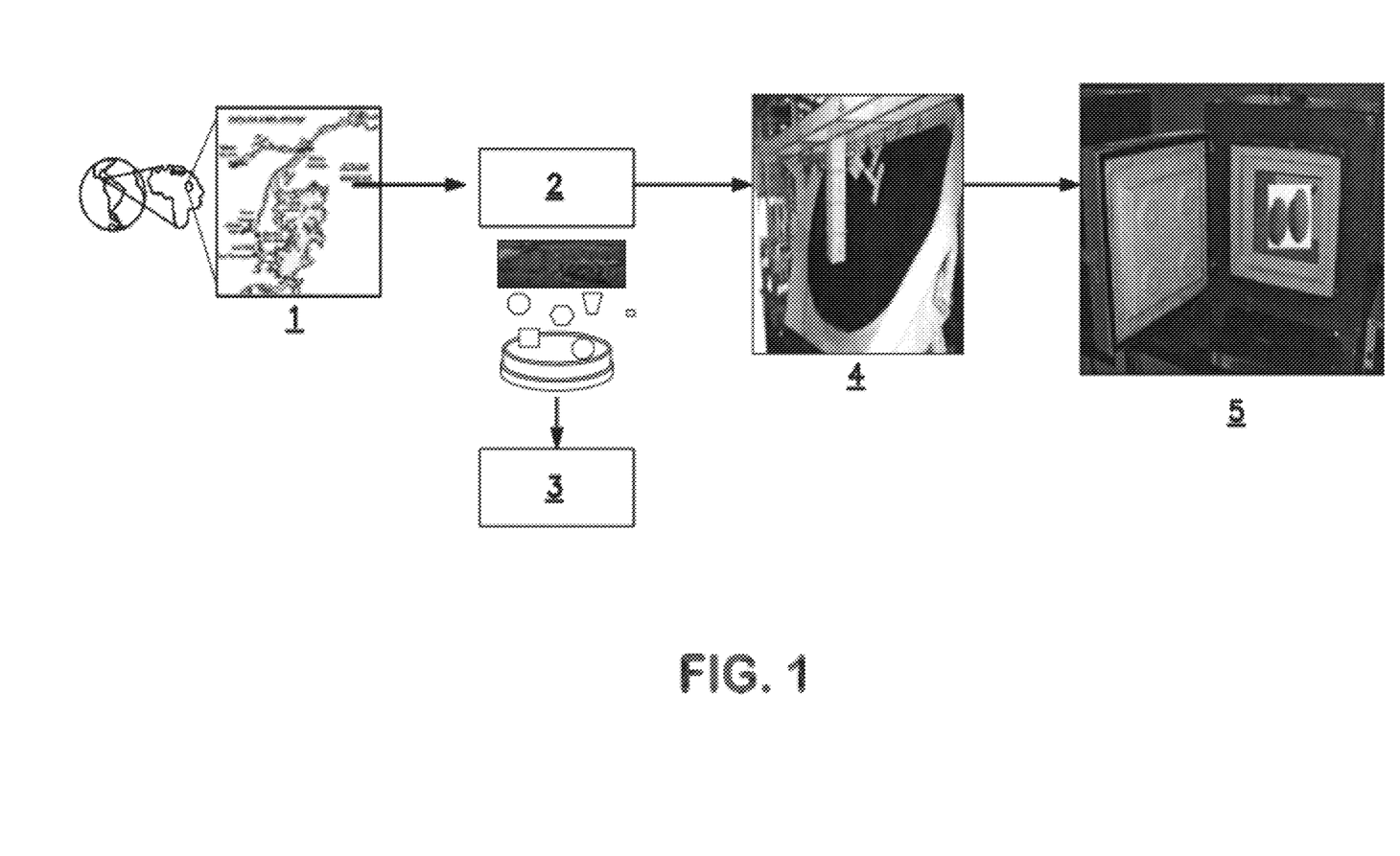
FIG. 1 illustratively depicts a non limiting process for the manufacture of the renewable sorbent.

Referring now to FIG. 1 there is shown the general steps for manufacturing the renewable sorbent of the present invention. Raw materials are obtained in step 1, for example from a national market such as Venezuela, where raw material, such as iron mineral and an expansive clay, may be easily obtained.

After the raw materials are obtained 1 they are then dried at 100° C. for about 24 hours. After drying the raw materials are then mixed together into a composition before they are crushed and sifted in a milling process 2. The milling may be carried out under any procedure that is well known within the art. For example, the dried raw material may be milled by a planetary ball mill. The raw material is milled to obtain a desired particle size of between about 50 microns to about 200 microns. The milled material may then be sifted through a 100 mesh sieve 3. In order to facilitate pelletization of the iron ore, the milled material is sifted to remove particles or materials that are above about 150 microns.

After the milling process 2, the raw material composition may be pelletized 4. The pelletization of the composition may be carried out under any procedure that is well known within the art, such as a tilted rotary disk, the pelletizing drum, the pelletizing disk and/or the pelletizing cone. During the pelletization process organic or inorganic binders, such as clays, cassava starch, potato starch and/or corn starch; admixtures, such as organic or inorganic binders in altering proportions; and water may be added to the ground raw material in order to control the binding strength of the pellets, to improve the mechanical properties of the pellets, to diminish thermal shock cracking of the pellets and to increase the strength of the pellets once they are burned. For optimum pelletization the particle size of the raw material may be less than 75 microns (200 mesh).

Two types of factors govern the pelletization process: Mechanical and Process factors. Table 1 details the mechanical factors that govern the pelletization process.

TABLE 1

| | FACTOR | EFFECT |
|---|---|---|
| MECHANICAL FACTORS | Disk inclination | Pellets grow less with increasing inclination because there is less |

TABLE 1-continued

| FACTOR | EFFECT |
|---|---|
| | retention time. |
| Slew rate | The higher speed, the more retention time. |
| Edge height | The higher the height, the more retention time, resulting in bigger pellets. |
| Input area | Input is made in the area where the pellet core is formed. |
| Addition of water | Excessive addition of water would result in a pellet with too much plasticity and humidity. |

Pelletization process factors include the fineness of the ground raw material, input flow of the ground raw material, the humidity content of the ground raw material and the mineralogy of the ground raw material. Process formation of the pellets by pelletizing disk is characterized by the formation of a flow pattern that ranks particles among three classes: Input fineness, the ground raw material entering the disk; Primary agglomerates, the initial pellet core; and Final pellets. Pellets are formed inside the disk due to the disks rotation, inclination and the homogenization of the mixture.

The pelletizing disk is continuously and steadily fed with the ground raw material as a liquid, such as water, is sprayed over the ground raw material inside the rotating pelletizing disk. The liquid drops collect rotating particles forming a primary agglomerate seed with increased density. The seed becomes denser as the liquid disturbed on its surface continues to collect ground raw material. The newly formed fresh or green pellet is extracted from the pelletizing disk once the desired pellet size is reached. The pelletization process preferably results in iron ore agglomerate pellets of approximately 1 centimeter in size.

After the pelletization process 4, the composition is calcined 5. The calcination process may be carried out by any procedure that is well known within the art. In order to prevent evaporation of the liquid and a violent breakage of the green iron ore agglomerate pellets, the temperature of the green pellets is gradually increased at a rate of 10° C. per minute until they are calcined at a temperature of about 500° C. to about 600° C.

The raw material used in this regenerable sorbent may include iron mineral, expansive clays and starch. The iron mineral may be an iron oxide obtained from Planta de Pellas Ferrominera del Orinoco (FMO) in Bolivar State. Other iron minerals that may be employed in the present invention include and are not limited to hematite, magnetite, maghemite and mixtures thereof. The expansive clay may be any expansive clay, such as vermiculite, bentonite, montmorillonite, blends of chlorite, kaolinite and mixtures thereof. The starch may be potato starch, corn starch, cassava, waxy corn and mixtures thereof.

After the ground raw material composition is pelletized and calcined, the resultant sorbent may then be exposed to a fluid stream containing acid gases. Due to a chemical reaction between the molecules of the acid gases in the fluid stream and the sorbent, gaseous particles are attracted to the sorbent. The acid gas particles in the fluid stream react with the molecules of the sorbent and are thus removed from the fluid stream. Some reactions which illustrate this process as applied to the acid gas hydrogen sulfide (H2S) are as follows:

$$4H2S(g) + Fe3O4(s) \rightarrow 4H2O(l) + S(s) + 3FeS(s)$$

$$6H2S(g) + Fe3O4(s) \rightarrow 4H2O(l) + 2H2(g) + 3FeS2(s)$$

$$3H2S(g) + Fe2O3(s) \rightarrow 3H2O(l) + FeS3(s)$$

The pelletization step 4 of FIG. 1 may be skipped or altered. The pelletization step is employed as a preferred shape for the inventive sorbent; however, the resultant shape of the sorbent may be any shape or design that is suitable for use in the removal of acid gas from a fluid stream. These shapes and designs include pellets, fine particles, shavings, calcined chips and muds.

Figure 2:
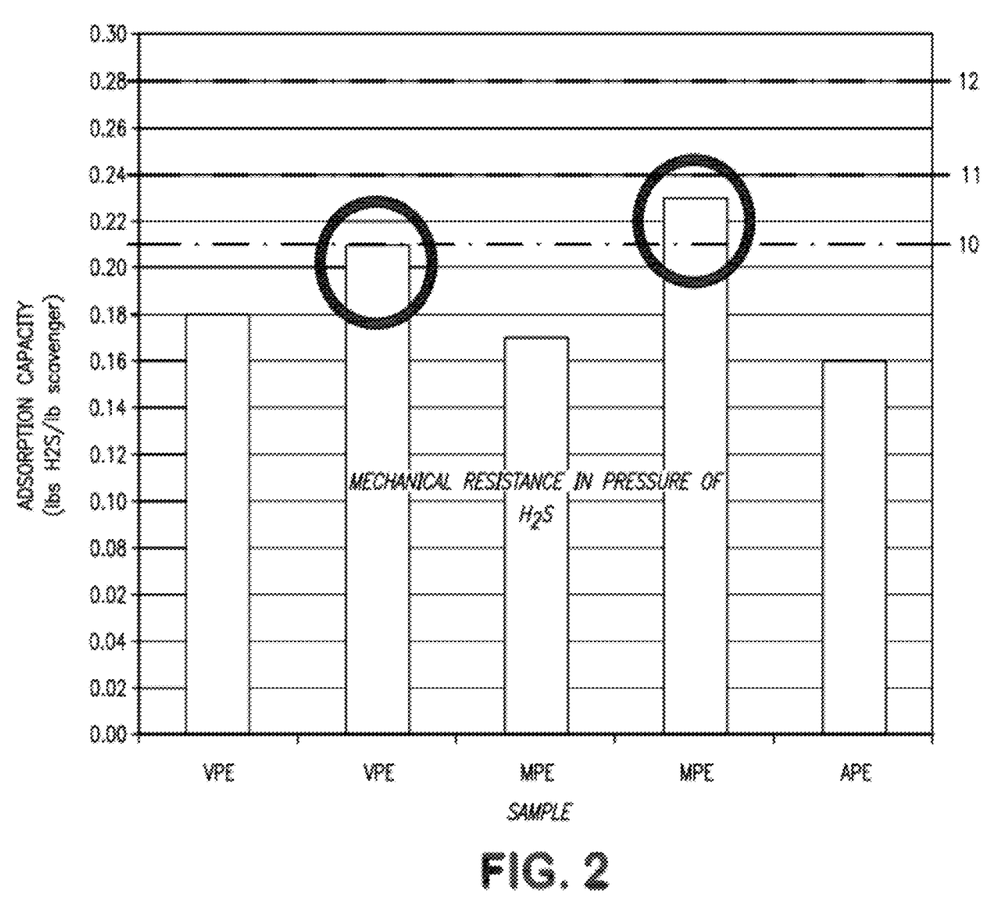
FIG. 2 graphically depicts the H2S adsorption of differing concentrations and compositions of the renewable sorbent.

Referring now to FIG. 2, samples were prepared and tested against commercial sorbents. A sorbent made from material taken from Planta de Pellas containing an agglomerate of dolomite, bentonite and iron ore calinated at about 500° C. to about 600° C. (CVG) 12, Sulfatreat XLP distributed by MI L.L.C. 11, and Sulfatreat STD distributed by MI L.L.C. 10 exhibit an H2S absorption of 0.28 lb H2S/lb sorbent 12, 0.24 lb H2S/lb sorbent 11, and 0.21 lb H2S/lb sorbent 10 respectively.

In FIG. 2, the absorption of the commercial sorbents is compared to a pelletized sorbent containing raw material comprising iron oxide and 2.5% w/w (by weight) vermiculite VPE 2.5, a sorbent containing raw material comprising iron oxide and 5% w/w vermiculite VPE 5, a sorbent containing raw material comprising iron oxide, 2.5% w/w vermiculite, 2.5% w/w starch MPE 2.5, a sorbent containing raw material comprising iron oxide, 5% w/w vermiculite and 5% w/w starch MPE 5 and a sorbent containing raw material comprising iron oxide and 2.5% w/w starch APE 2.5.

FIG. 2 shows the H2S adsorption capacity of pellets with 5% vermiculite to be 0.21 lb H2S/lb sorbent VPE 5 and pellets prepared with 5% vermiculite and 5% starch have an increased adsorption capacity of 0.23 lb H2S/lb sorbent MPE 5. These adsorption capacities place the raw material composition of iron mineral, vermiculite and starch within the efficiency range of the adsorption capacities of commercial sorbents.

After the sorbent has been exposed to the fluid stream, the sorbent may be removed and regenerated. The sorbent is regenerated by treating the reacted sorbent with hydrogen peroxide. Hydrogen peroxide in the presence of an iron catalyst results in an oxidation known as Fenton's reaction. The procedure involves the oxidation of $Fe^{2+}$ to $Fe^{3+}$ by hydrogen peroxide, yielding hydroxyl radicals:

$$Fe^{2+} + H2O2 \rightarrow Fe^{3+} + {}^-OH + .OH$$

After the pellets are exposed to the acid gas stream and/or oil stream they are composed of iron sulfurs. The pellets are regenerated by exposing them to H2O2:

$$FeS + H2O2 \rightarrow S_{(o)} + Fe(OH)3$$

The black exposed pellets are embedded in hydrogen peroxide (3% m/v) for 24 hours. The pellets recover their initial red color as a result of the oxidation of iron to maghemite and hematite, respectively. Traces of sulfur were found in the oxygenated water after washing out the pellets.

Figure 3:
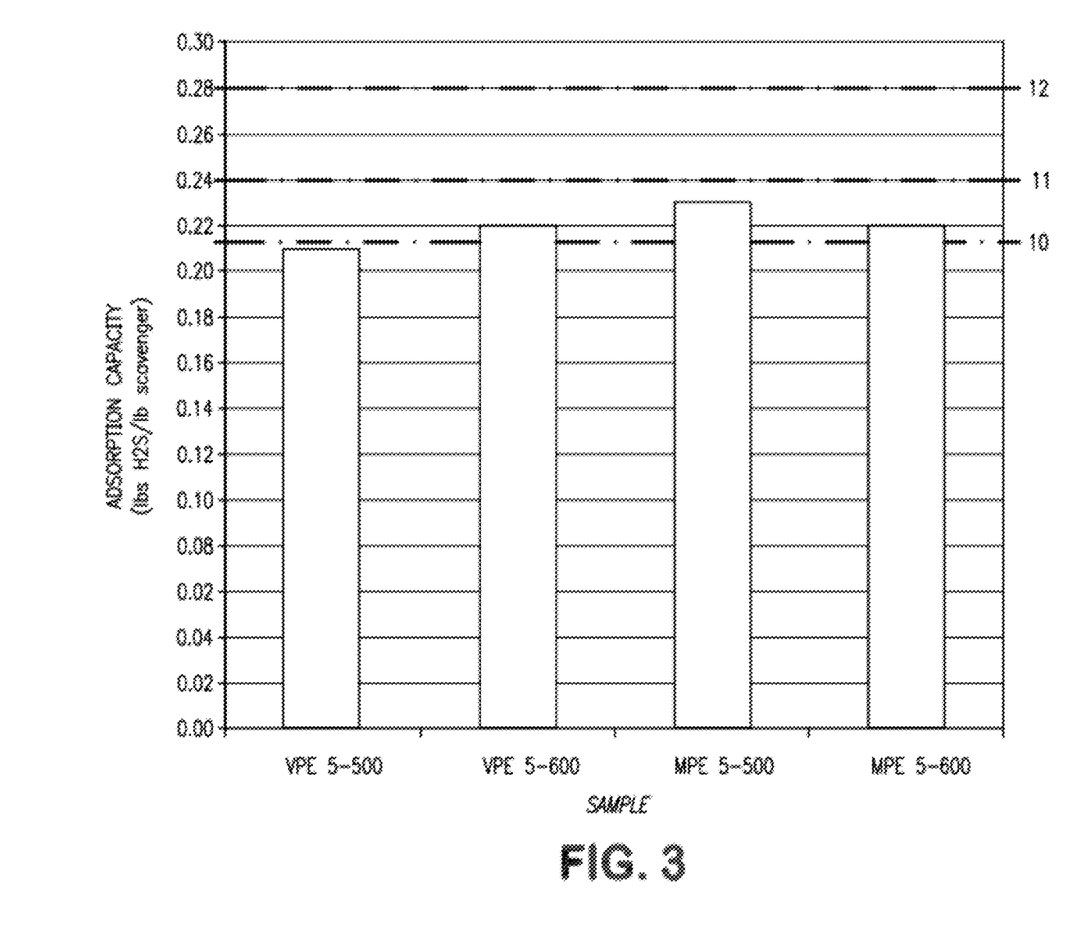
FIG. 3 graphically depicts the drop in H2S pressure in the system after regenerization.

After testing the H2S adsorption capacity of the first-time use of a group of 5% VPE pellets, the pellets were subjected to a basic analysis of sulfur. Next, the pellets were washed with H2O2 to reassess their adsorption capacity. This process was repeated three times in order to get a trend of values with regard to the H2S removal capacity and the sulfur profile of the pellets. FIG. 3 graphically depicts the pressure drop values for three subsequent uses of the pellets.

Figure 4:
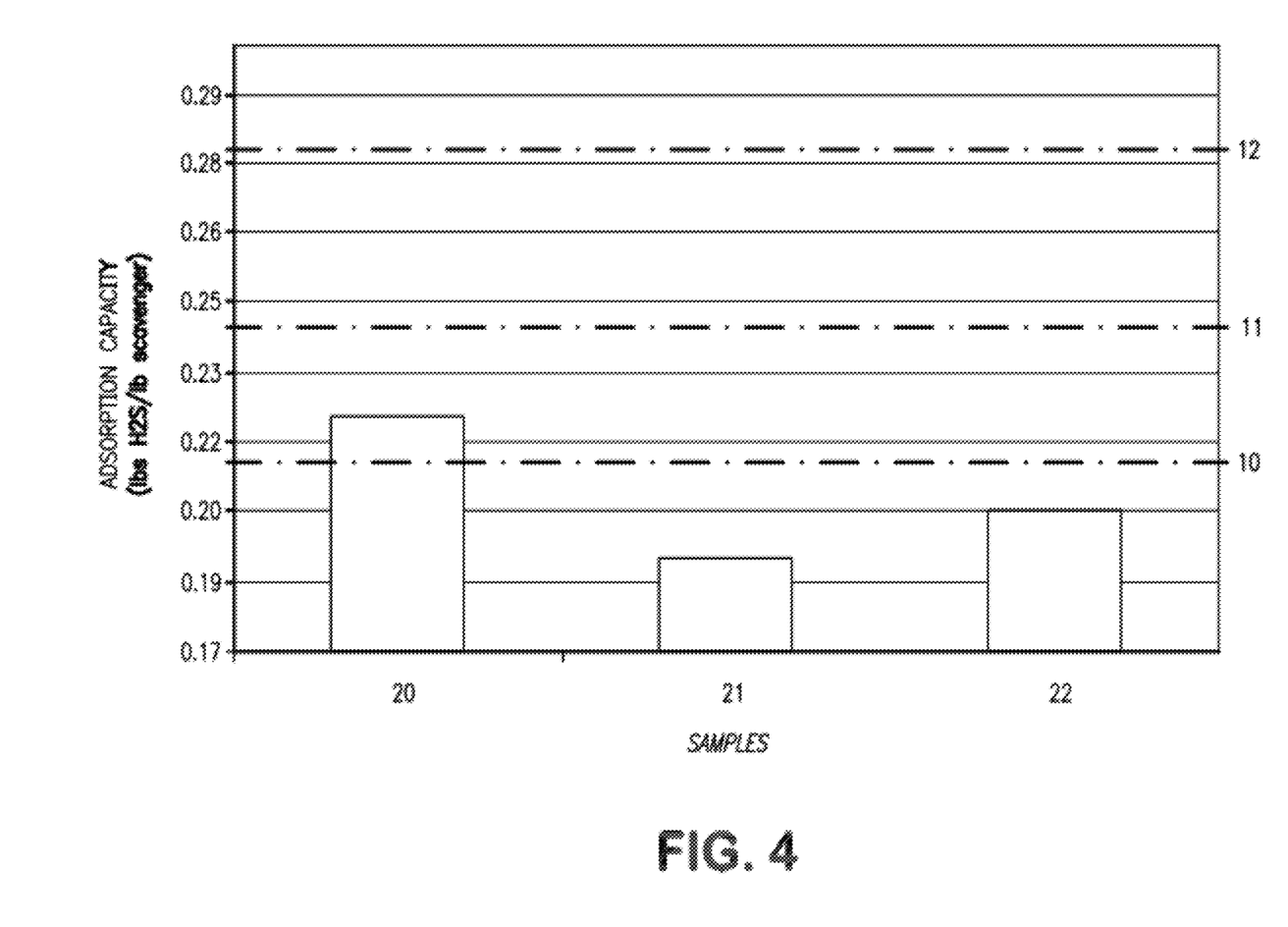
FIG. 4 graphically depicts the trend for the H2S absorption values and regeneration stages.

FIG. 3 shows a H2S pressure drop for each stage of reutilization/regeneration of pellets containing 5% of vermiculite. The pressure drop is an indicator of the H2O2 regenerative capacity of the 5% VPE pellets. FIG. 4 displays the experimental trend for the H2S adsorption capacity values estimated from the H2S pressure drop.

FIG. 4 shows that while the number of regenerations of the pellets increases from Assay 1 to Assay 2 to Assay 3, the mass of H2S that can be removed from the system decreases; however, after three regenerations the same pellet is still able to remove acid gas.

Figure 5:
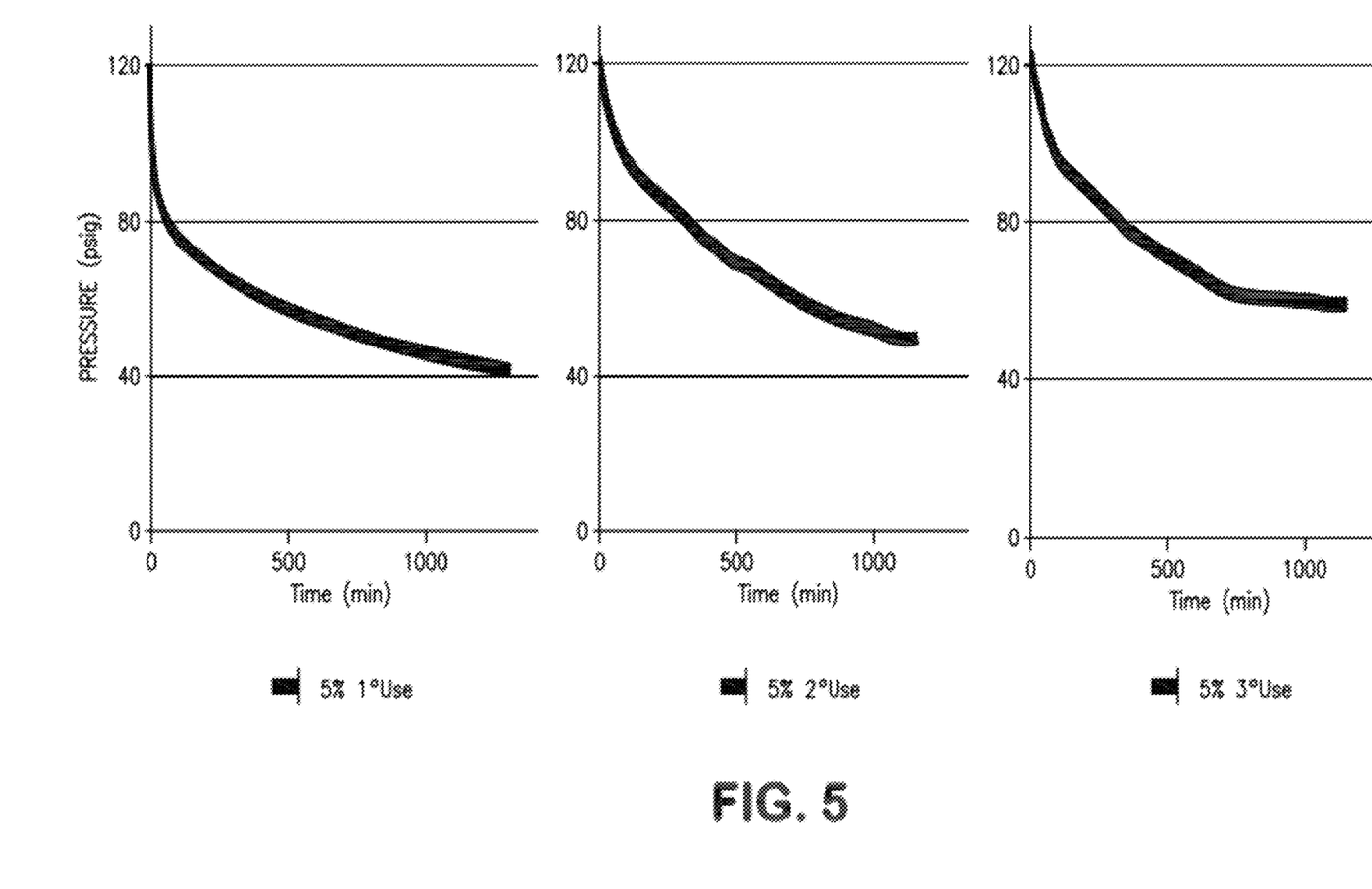
FIG. 5 graphically depicts the percentage of sulfur accumulated on the pellets according to the reutilization/regeneration cycle.

As depicted in FIG. 5, the percentage of sulfur accumulated on the pellets grows according to the reutilization/regeneration cycles. It can be inferred from FIG. 5 that following three cycles of regeneration, the pellets adsorption capacity is affected, diminished or depleted, possibly due to Fenton's reaction, i.e. sulfur obstructs the pellets active collection centers. However, upon further testing, after reacting to H2S and being subject to a bath with hydrogen peroxide for approximately 24 hours, the pellets mechanical strength was higher than the initial mechanical strength.

Table 2 lists some physical and chemical characteristics of the 5% MPE sample (5 MPE) and the 5% VPE sample (5VPE).

TABLE 2

| ANALYSIS | 5MPE | 5VPE |
|---|---|---|
| X RAY DIFRACTION (XRD) | Aluminium Magnesumferrite (Mg Al0.74 Fe1.26)O4, Hematite (Fe2O3), Silica (SiO2) | Hematite (Fe2O3), Silica (SiO2) |
| MACROPOROSITY | Average Diameter Pore = 0.39 μm | Average Diameter Pore = 2.67 μm |
| BED RESISTANCE | Has Not | 1.90 Kg/f |
| REAL DENSITY (HELIUM PICNOMETRY) | 4.7 gr/mL | 4.6 g/mL |
| APPARENT DENSITY | 4.5 gr/mL | 4.0 gr/mL |
| SUPERFICIAL AREA | Determined by BET = 8.56 m2/gr | Determined by BET = 12.76 m2/gr |
| METAL ANALYSIS IN PPM BY ATOMIC SPECTROSCOPY (ICP-OES) | Ca = 2877, K = 393, Na = <350, Mn = 2085, P = 661 | No realized |
| IRON % ANALYSIS BY ATOMIC SPECTROSCOPY ICP-OES) | 44% | 46% |
| CUALITATIVE ANALYSIS OF ELEMENT BY X RAY FLUORESCENCE | *Fe, Mn, Ti, Ca, K, P, Si | *Fe, Zr, Mn, Ti, Ca, K, S, P, Si |

Figure 6:
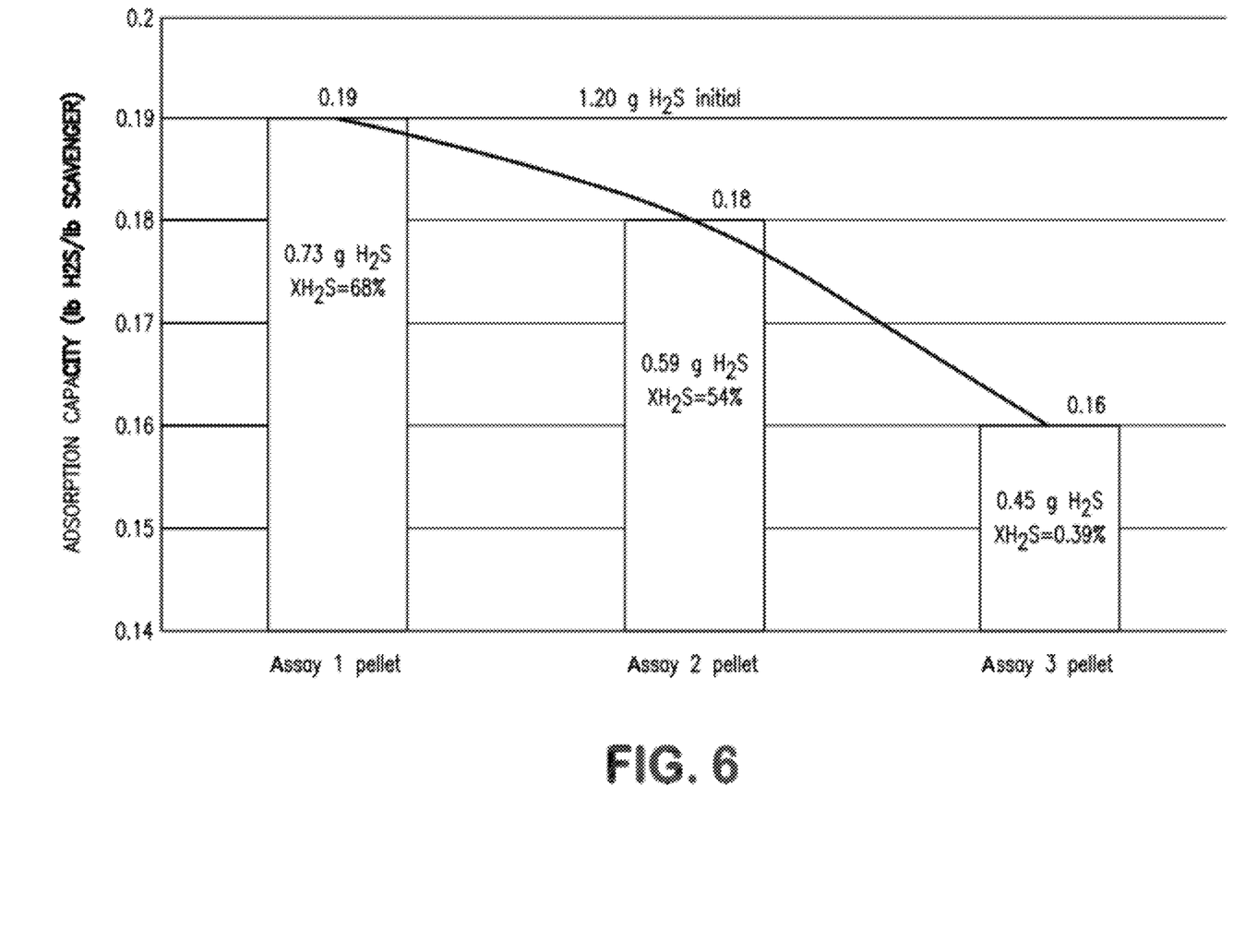
FIG. 6 graphically depicts the H2S adsorption of the renewable sorbent at differing calcinating temperatures.

FIG. 6 depicts the adsorption capacity of pellets calcined at about 500° C. to about 600° C. The absorption of CVG 12 and the commercial sorbents, Sulfatreat XLP 11, and Sulfatreat STD 10, is compared to a pelletized sorbent containing raw material comprising iron oxide and 5% w/w (by weight) vermiculite calcined at 500° C. VPE 5-500 and 600° C. VPE 5-600, along with a sorbent containing raw material comprising iron oxide, 5% w/w vermiculite and 5% w/w starch calcined at 500° C. MPE 5-500 and 600° C. MPE 5-600.

FIG. 6 confirms that raw material compositions VPE 5-500, VPE 5-600, MPE 5-500 and MPE 5-600 exhibit an efficiency that is either within the range of the commercial sorbents or comparable to the commercial sorbents. The raw material composition comprising iron oxide, 5% w/w vermiculite and 5% w/w starch calcined at 500° C. MPE 5-500 exhibits the most efficient adsorption capacity of approximately 0.23 lb H2S/lb sorbent.

Figure 7:
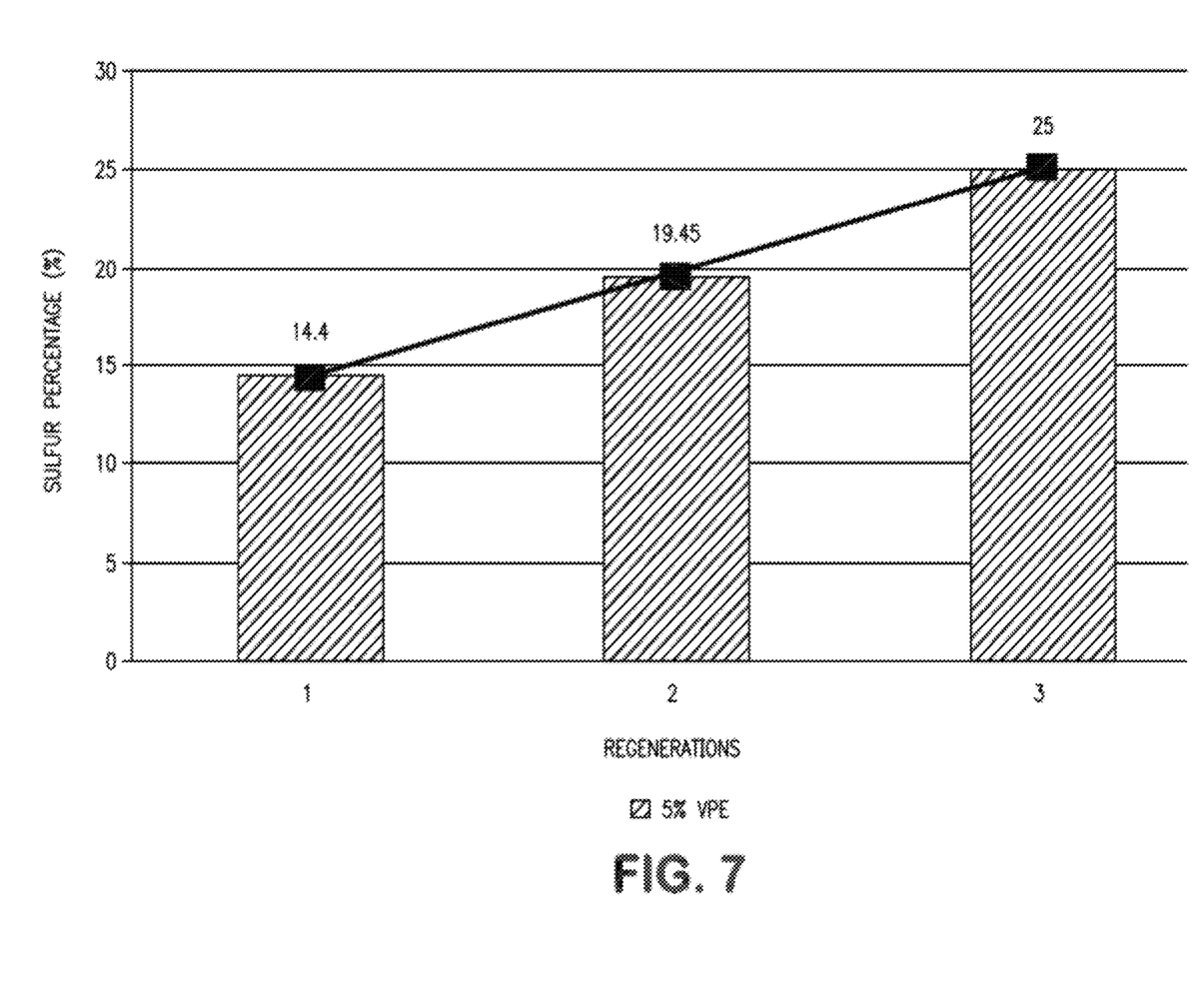
FIG. 7 graphically depicts the H2S adsorption of the renewable sorbent at differing experimental conditions.

FIG. 7 evaluates the raw material composition comprising iron oxide, 5% w/w vermiculite and 5% w/w starch calcined at 500° C. MPE 5-500 at differing experimental conditions. The MPE 5-500 composition was evaluated against CVG 12 and the commercial sorbents, Sulfatreat XLP 11, and Sulfatreat STD 10, for the absorption capacity of pellets with a diameter of 0.5 cm 20, for the effect of 0.6 ml of water on the pellets 21, and for the effect of regeneration after treatment with hydrogen peroxide.

As shown in FIG. 7, the MPE 5-500 composition remains effective at a pellet diameter of 0.5 cm. Additional tests have shown that as the diameter of the pellet diminishes in the fluid stream the adsorption capacity can increase. FIG. 7 also shows that after the MPE 5-500 composition has been exposed to the fluid stream, the composition may be reacted with hydrogen peroxide to again obtain a H2S removal efficiency of 0.20 lb H2S/lb sorbent.

The regenerable sorbent of the present invention is used within a cost effective process for the removal of hydrogen sulfide from production fluid streams. The regenerable sorbent for the removal of acid gas employed in the current application is not only cost effective through its ability to be easily renewed through a reaction with hydrogen peroxide, the process also exhibits high single pass performance in its ability to remove up to 0.23 lb H2S/lb sorbent from a production fluid stream.

The regenerable sorbent of the present invention may be inexpensively made from materials found within national markets, such as Venezuela. The combination of iron mineral, expansive clay and starch may be employed in a variety of sweetening plants to remove acid gases from numerous production fluid streams. The acid gas may be any gas in which it is desirable to remove acids, such as hydrogen sulfide, sulphide carbonyl, mercaptans and mixtures thereof.

The regenerable sorbent of the present invention may be implemented in other possible applications. The final characteristics of the regenerable sorbent of the present invention may be applied to conventional well technology, and any application that may benefit from the extraction of acid gases from fluid streams.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for the removal of acid gas from a fluid stream, comprising the steps of:
   crushing a composition comprising expansive clay and an iron mineral so as to produce crushed expansive clay and iron mineral composition;
   sifting the crushed expansive clay and iron mineral composition so as to produce a sifted expansive clay and iron mineral composition, said sifted expansive clay and iron mineral composition having particle sizes between 50 μm and 150 μm;
   calcinating the sifted expansive clay and iron mineral composition at a temperature of between 500° C. and 600° C. so as to produce a sorbent comprising the calcined expansive clay and iron mineral composition; and
   contacting the sorbent with the fluid stream so as to produce a treated fluid stream having a reduced acid gas content;
   wherein the contacting step produces a spent sorbent, and wherein the process further comprises:
   treating the spent sorbent with hydrogen peroxide so as to produce a treated sorbent; and
   re-contacting the treated sorbent with the fluid stream.

2. The process of claim 1, further comprising the step of pelletizing the sifted expansive clay and iron mineral composition after the sifting step and before the calcinating step so as to produce a pelletized expansive clay and iron mineral composition, and wherein the calcinating step is carried out with the pelletized expansive clay and iron mineral composition.

3. The process of claim 1, wherein the composition further comprises starch.

4. The process of claim 1, wherein the fluid stream contains acid gas is selected from the group consisting of hydrogen sulfide, sulphide carbonyl, mercaptans and mixtures thereof.

5. The process of claim 1, wherein the fluid stream is selected from the group consisting of a gas stream, an oil stream and mixtures thereof.

6. The process of claim 1, wherein the expansive clay is selected from the group consisting of vermiculite, bentonite, montmorillonite, blends of chlorite, kaolinite and mixtures thereof.

7. The process for of claim 1, wherein the iron mineral is selected from the group consisting of iron oxide, hematite, magnetite, maghemite and mixtures thereof.

8. The process of claim 1, wherein the iron mineral is selected from the group consisting of iron oxide, hematite, magnetite, maghemite and mixtures thereof, wherein the expansive clay is selected consisting of vermiculite, Bentonite, montmorillonite, blends of chlorite, kaolinite and mixtures thereof, and wherein the composition further comprises a starch selected from the group consisting of potato starch, corn starch, cassava, waxy corn and mixtures thereof.

9. The process of claim 8, wherein the composition has at least 2.5% w/w of said starch.

10. The process of claim 8, wherein the composition has 5% w/w of said starch.

11. The process of claim 1, wherein the sifting step further comprises removing particles that are above 150 μm in size so as to produce said sifted expansive clay and iron mineral composition consisting of particles having sizes between 50 μm and 150 μm.

* * * * *